(12) United States Patent
Fang

(10) Patent No.: US 6,967,923 B1
(45) Date of Patent: *Nov. 22, 2005

(54) BANDWIDTH ALLOCATION FOR ATM AVAILABLE BIT RATE SERVICE

(75) Inventor: Chien Fang, Danville, CA (US)

(73) Assignee: Cisco Technology, Inc., San Jose, CA (US)

(*) Notice: Subject to any disclaimer, the term of this patent is extended or adjusted under 35 U.S.C. 154(b) by 126 days.

This patent is subject to a terminal disclaimer.

(21) Appl. No.: 10/338,173

(22) Filed: Jan. 7, 2003

Related U.S. Application Data

(62) Division of application No. 09/293,603, filed on Apr. 15, 1999, now Pat. No. 6,512,743.

(51) Int. Cl.[7] .............................................. H04L 12/56
(52) U.S. Cl. ..................... 370/232; 370/236.1; 370/468
(58) Field of Search ............................ 370/389, 401, 370/230–235, 236.1, 395.41, 395.1, 468

(56) References Cited

U.S. PATENT DOCUMENTS

| 5,193,151 | A |   | 3/1993  | Jain        | 395/200  |
|-----------|---|---|---------|-------------|----------|
| 5,377,327 | A |   | 12/1994 | Jain et al. | 395/200  |
| 5,633,859 | A | * | 5/1997  | Jain et al. | 370/234  |
| 5,805,577 | A |   | 9/1998  | Jain et al. | 370/234  |
| 5,812,527 | A | * | 9/1998  | Kline et al.| 370/232  |
| 5,991,268 | A | * | 11/1999 | Awdeh et al.| 370/232  |
| 6,373,844 | B1| * | 4/2002  | Saito       | 370/395.1|

OTHER PUBLICATIONS

"A Brief Overview of ATM: Protocol Layers, LAN Emulation, and Traffic Managment" by Kai-Yeung Siu and Raj Jain, pp. 1-15.

"Source Behavior for ATM ABR Traffic Management: An Explanation" by Raj Jain, Shivkumar Kalyanaraman, Sonia Fahmy, Rohit Goyal and Seong-Cheol Kim, *ATM Forum Technical Working Group Members (Traffic Management)*, Oct. 1996, pp. 1-19.

"Congestion Control and Traffic Management in ATM Networks: Recent Advances and A Survey" by Raj Jain, pp. 1-26.

"The OSU Scheme for Congestion Avoidance in ATM Networks: Lessons Learnt and Extensions" by Raj Jain, Shiv Kalyanaraman and Ram Viswanathan, pp. 1-20.

"ERICA+: Extensions to the ERICA Switch Algorithm" by Raj Jain, Shiv Kalyanaraman, Rohit Goyal, Sonia Fahmy and Fang Lu, *ATM Forum Technical Working Group Members (Traffic Management)*, Oct. 1995, pp. 1-16.

"ERICA Switch Algorithm: A Complete Description" by Raj Jain, Shiv Kalyanaraman, Rohit Goyal, Sonia Fahmy and Ram Viswanathan, *ATM Forum Technical Working Group Members (Traffic Management)*, Aug. 1996, pp. 1-46.

"A Brief Overview of ATM: Protocol Layers, LAN Emulation, and Traffic Management" by Kai-Yeung Siu and Raj Jain, pp. 1-15.

(Continued)

*Primary Examiner*—Kenneth Vanderpuye
(74) *Attorney, Agent, or Firm*—Marger Johnson & McCollom, P.C.

(57) ABSTRACT

An ATM switch, and method for operating such a switch, are disclosed. In one embodiment, the switch detects ABR VCs that are likely bottlenecked elsewhere in their network path, allowing it to calculate a fair share of available bandwidth for those VCs that are bottlenecked locally. In another embodiment, the switch combines this fair share value with a per-VC queue congestion prediction to arrive at an explicit rate for that VC. The congestion prediction is based on a VC's queue occupancy and upon the VC's rate and rate trend, allowing fast response times and aggressive explicit rate values. The present invention allows switches to maximize throughput while maintaining small queue sizes.

36 Claims, 8 Drawing Sheets

OTHER PUBLICATIONS

"Source Behavior for ATM ABR Traffic Management: An Explanation" by Raj Jain, Shivkumar Kalyanaraman, Sonia Fahmy, Rohit Goyal and Seong-Cheol Kim, *ATM Forum Technical Working Group Members* (*Traffic Management*), Oct. 1996, pp. 1-19.

"Congestion Control and Traffic Management in ATM Networks: Recent Advances and A Survey" by Raj Jain, pp. 1-26.

"The OSU Scheme for Congestion Avoidance in aTM Networks: Lessons Learnt and Extensions" by Raj Jain, Shiv Kalyanaraman and Ram Viswanathan, pp. 1-20.

"ERICA+: Extensions to the ERICA Switch Algorithm" by Raj Jain, Shiv Kalyanaraman, Rohit Goyal, Sonia Fahmy and Fang Lu, *ATM Forum Technical Working Group Members* (*Traffic Management*), Oct. 1995, pp. 1-16.

"ERICA Switch Algorithm: A Complete Description" by Raj Jain, Shiv Kalyanaraman, Rohit Goyal, Sonia Fahmy and Ram Viswanathan, *ATM Forum Technical Working Group Members* (*Traffic Management*), Aug. 1996, pp. 1-46.

* cited by examiner

BANDWIDTH ALLOCATION FOR ATM AVAILABLE BIT RATE SERVICE

FIELD OF THE INVENTION

This application is a division of prior U.S. Ser. No. 09/293,603, filed Apr. 15, 1999 now U.S. Pat. No. 6,512,743, which is hereby incorporated in its entirety by reference.

This invention pertains generally to Asynchronous Transfer Mode (ATM) packet switching, and more particularly to methods and systems for switch bandwidth allocation for ATM available bit rate service.

BACKGROUND OF THE INVENTION

ATM is a networking standard designed to provide simultaneous support for voice, video, and data traffic. An ATM network is packet-switched, but supports only one particular packet size—a 53-byte packet called a cell. Without regard to the type of information contained in a cell, each ATM cell must have a five-byte cell header and a 48-byte payload.

ATM is connection oriented. That is, two systems must set up an end-to-end "connection" over the network before they can communicate. But the connection does not require a dedicated circuit like a traditional telephone network connection; instead, the connection is merely a grant of permission to transmit cells at a negotiated data rate, with some guarantees as to quality-of-service (QoS) parameters such as minimum cell rate, average cell rate, and network delay. The term commonly used for an ATM connection is a Virtual Channel or "VC".

ATM contains several service classes, each designed to meet the needs of particular types of information sources. The Constant Bit Rate (CBR) service class is most appropriate for sources having a known, constant transmission rate, such as traditional PCM-sampled telephone signals. The Variable Bit Rate (VBR) service class allows some variation in transmission rate but provides bandwidth guarantees, and is appropriate for digital video (e.g., MPEG-coded or H.26x video) and similar applications. The Available Bit Rate (ABR) service class is appropriate for most data transmission. ATM switches monitor their excess capacity (that part not being used by other service classes with guaranteed rates) and allocate that capacity to their ABR connections. Each ABR source is required, in return, to control its rate as directed by the switches in its connection path. Finally, the Unspecified Bit Rate (UBR) service class is also available for data transmission. UBR traffic has no guarantees as to cell loss rate or delay, but places few restraints on the behavior of sources.

ABR and UBR traffic can be regarded as "best-effort" traffic. That is, CBR and VBR traffic have precedence because of their QoS guarantees, and ATM switches work to schedule ABR and UBR traffic around their CBR and VBR traffic. In order to provide an incentive for best-effort traffic sources to utilize ABR connections, ATM switches attempt to divide their unreserved capacity fairly and efficiently between all competing ABR sources.

The "ERICA" and "ERICA+" switch congestion avoidance algorithms, as disclosed by R. Jain et al. in U.S. Pat. No. 5,805,577, represent a state-of-the-art approach to controlling ABR traffic. These algorithms measure switch utilization over "averaging intervals", including making a count of the number of sources that utilized the switch during the interval. At the end of each such interval, an available ABR capacity for the next such interval is computed. Then, a "fair share" of the available ABR capacity is determined by dividing the capacity by the number of sources that were active over the preceding interval.

An overload factor is also calculated to represent the current overall switch load as a percentage. An explicit rate is then assigned to each source for use during the next measurement interval, based on its current rate, as:

Explicit Rate=max(Fair Share, Current Rate/Overload Factor)

This explicit rate is communicated to its corresponding source.

SUMMARY OF THE INVENTION

The present invention is related to ATM switch operation, and more particularly, to allocation of bandwidth between competing ABR sources. The goals of the present invention are to maximize throughput and minimize queueing delay, while treating each source fairly.

The present invention overcomes several shortcomings of prior art algorithms such as "ERICA". First, the prior art algorithms do not directly identify, and consider the effect of, sources that cannot or do not wish to transmit their "fair share"—this causes such algorithms to underestimate the true "fair share" available to those sources that want to transmit more, resulting in slow convergence to max-min fairness. Second, these algorithms tend to base each VC's explicit rate proportionally on that VC's current rate and on the distance the switch loading is from its optimal loading—an approach that also slows convergence toward a fair solution. Third, these algorithms generally attempt to distribute one or two global solutions to all sources, instead of predicting individual source behavior and tailoring the solution to each source. Fourth, these algorithms generally cannot provide feedback to sources at a rate that exceeds the switch's averaging interval. And fifth, these algorithms do not provide for an efficient and fair allocation of bandwidth between ABR and UBR sources.

The present invention includes a recognition of the problems identified above, and solutions to each. For example, one embodiment of the present invention includes a procedure for identifying VC's that have their rate limited at other points in their connection—this allows bandwidth that cannot be utilized by such bottlenecked sources to be immediately allocated to other, non-bottlenecked sources. And in one embodiment, overall switch queue congestion is not a direct factor in setting source rates—instead, the source rate for each source depends on that source's own current congestion and recent behavior. The present invention also includes embodiments that combine rate measurements, which require an averaging interval, with queue measurements, which do not, in order to provide rate-based feedback that can vary at a rate greater than the averaging interval. And finally, the present invention includes embodiments that allocate some bandwidth explicitly to UBR sources, and yet make excess UBR bandwidth immediately available to ABR sources if UBR sources are under-utilizing it.

In one aspect of the present invention, a method of determining allowable cell rates for sources utilizing a switch is disclosed. The method comprises the steps of estimating the number of rate-controlled sources actively utilizing the switch, and estimating the cell rate available to serve those sources. Active sources that are likely bottlenecked elsewhere in their connection are identified. A reduced available cell rate is estimated by reducing the cell rate available to serve the active sources by a bottlenecked source cell rate based on estimated cell rates of the active sources that are likely bottlenecked elsewhere. Finally, a fair share of the reduced available cell rate is calculated by apportioning the reduced available cell rate among those active sources that are not likely bottlenecked elsewhere.

In a second aspect of the invention, a method of providing rate feedback to a rate-controlled source utilizing a switch is disclosed. The switch monitors the cell queue occupancy for the rate-controlled source. Upon receiving a backward resource management cell bound for the rate-controlled source, the switch calculates an explicit rate for the source based on a fair share rate and the source's predicted cell queue occupancy. The switch then inserts the explicit rate in the backward resource management cell when the explicit rate is lower than the explicit rate already contained in the cell.

In yet another aspect of the invention, a cell switch is disclosed. The cell switch comprises a cell queue that maintains a source cell queue for each rate-controlled source utilizing the switch, and a cell counter that counts the number of cells passing through each source cell queue. The cell switch further comprises a bottlenecked source detector that detects bottlenecked sources based on statistics calculated by the cell counter. Preferably, the cell switch also has a resource management cell processor that calculates an explicit rate for a resource management cell passing through the switch, based on a rate supplied by an available bit rate estimator, cell rate statistics calculated by the cell counter for the source corresponding to the resource management cell, and source queue occupancy statistics calculated by the cell queue for the source corresponding to the resource management cell.

BRIEF DESCRIPTION OF THE DRAWING

The invention may be best understood by reading the disclosure with reference to the drawing, wherein.

DETAILED DESCRIPTION OF THE PREFERRED EMBODIMENTS

Several terms in this disclosure have defined meanings. Although a source can in practice have multiple parallel VCs open through a switch, in the following description, unless identified otherwise, each "source" is assumed to send cells over a single VC, and is thus identified with a single VC. A "rate-controlled source" is a source that responds to rate information fed back to it from other elements in its VC. An "unspecified bit rate source", on the other hand, does not rely on such rate-controlling information.

Figure 1:
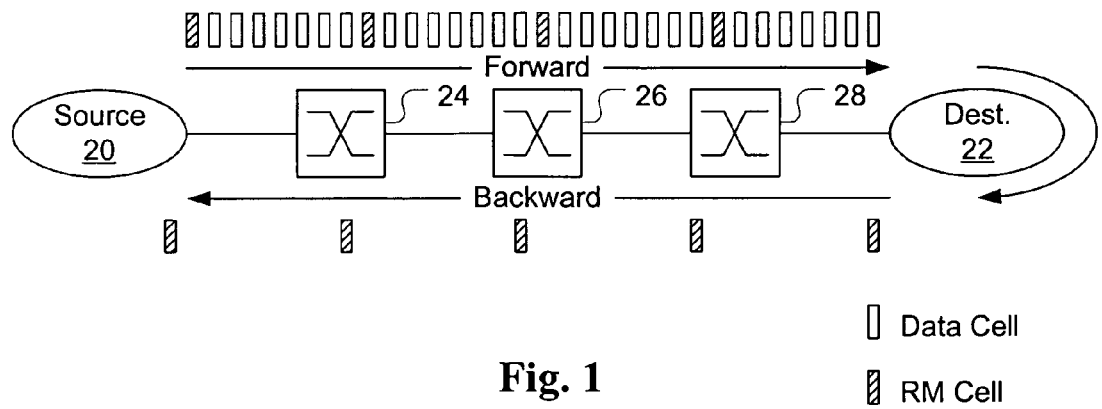
FIG. 1 illustrates cell transmission for an ATM ABR network path.

Referring to FIG. 1, an ATM connection between a source and destination is shown in order to illustrate the ABR flow-control model. Source 20 sends cells to destination 22 at its allowed rate, the stream of cells passing through ATM switches 24, 26, and 28. At specified intervals, ABR source 20 must insert Resource Management (RM) cells into its data stream. The RM cells pass through ATM switches 24, 26, and 28, and are "turned around" at destination 22 and returned through ATM switches 28, 26, and 24 back to source 20. An RM cell is called an FRM cell when it is being transmitted in the forward direction (from source to destination), and a BRM cell after it is turned around and transmitted in the backwards direction. Switches 24, 26, and 28 (and in some circumstances destination 22) are allowed to modify rate feedback information carried by an RM cell. When source 20 receives a BRM cell, it must adjust its allowed cell rate according to information contained in the BRM cell.

RM cells carry several types of feedback information that can be used by switches to control source cell rate. The Congestion Indication (CI) bit can be set by a switch to indicate high congestion and force a source to reduce its rate. The No Increase (NI) bit can be set by a switch to indicate mild congestion and prevent a source from increasing its rate. And the two-byte Explicit Rate (ER) field can be set by a switch to any desired rate to instruct a source of its current maximum allowed rate. Switches that control source cell rate using CI and NI are referred to as Relative Rate Marking switches. Switches that control source cell rate using the ER field are referred to as Explicit Rate Marking switches.

When a source receives a BRM cell, it adjusts its allowed cell rate according to the CI, NI, and ER fields in the BRM cell. Essentially, the source adjusts its Allowed Cell Rate (ACR) as follows:

if (CI==1 )
   ACR=ACR−ACR * RDF;
else if (NI==0 )
   ACR=ACR+RIF * PCR;
   ACR=min(ACR, PCR);
ACR=min(ACR, ER );
ACR=max(ACR, MCR );

Thus, if the CI bit is set in a received backward RM cell, the Allowed Cell Rate is decreased by a multiplicative Rate Decrease Factor (negotiated at connection setup). If neither the CI nor the NI bits are set, the ACR is increased by an additive factor (a fraction of the source's Peak Cell Rate (PCR), the fraction specified by the Rate Increase Factor (RIF)), and limited to the Peak Cell Rate. Finally, ACR is upper bounded by the received ER, and lower bounded by the negotiated Minimum Cell Rate (MCR).

In the present invention, source ACR is controlled with ER. In a particularly preferred embodiment, CI is used in conjunction with ER to control source ACR. This embodiment thus uses both Relative Rate Marking and Explicit Rate Marking.

Figure 2:
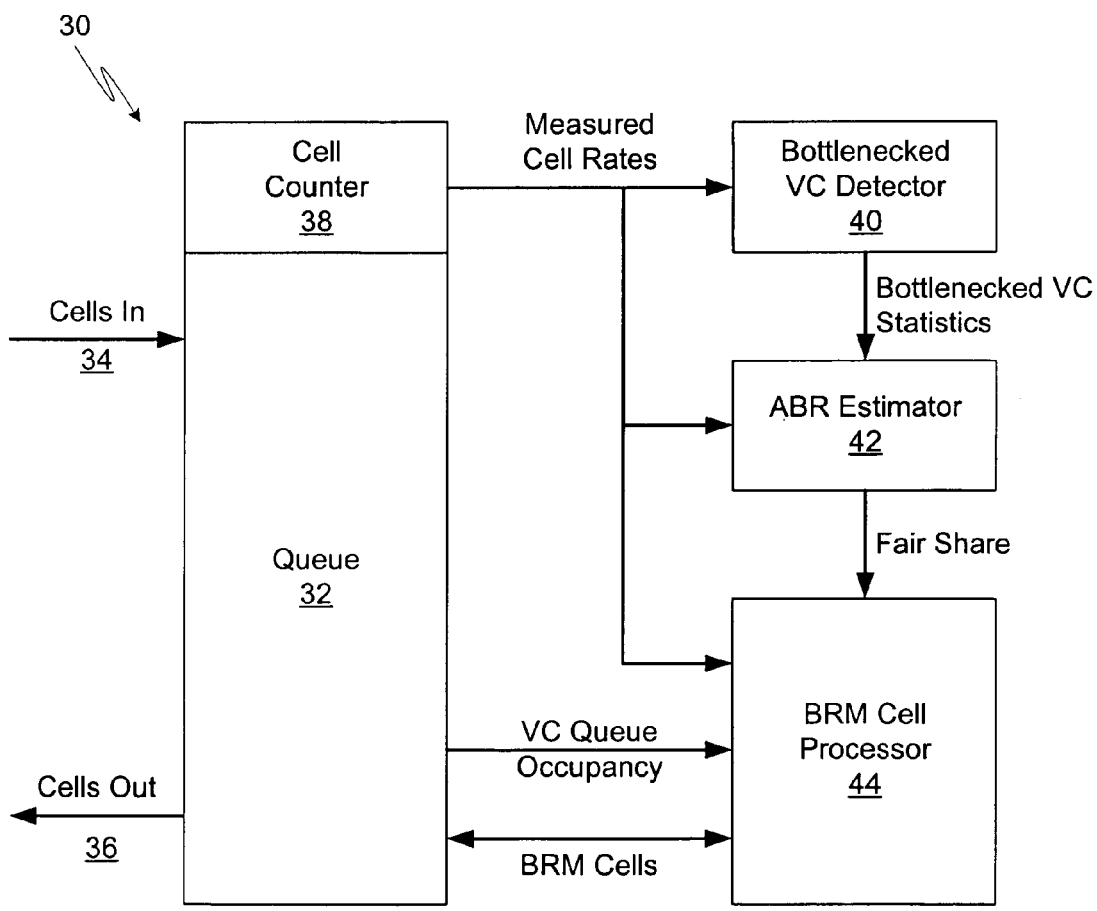
FIG. 2 shows a switch configuration according to one embodiment of the invention.

An exemplary switch embodiment 30 of the invention is shown in FIG. 2. FIG. 2 shows necessary switch components for implementing one output port of an output-buffering switch—those of ordinary skill will recognize that these components will appear at each output port of the switch. A queue 32 services incoming cells 34, buffering them in per-VC queues until they can be transmitted as departing cells 36. Per-VC queuing means that the switch buffers cells separately for each VC, although typically the separate buffering is a virtual partitioning of a shared memory resource that forms the queue. The nominal cell period of exemplary switch 30 is 2.726 μs, corresponding to a link data rate of 155.52 Mbps.

Cell counter 38 counts cells received for each ABR VC, using a separate counter for each VC. It may also count cells received for each CBR, VBR, and UBR VC separately, or it may choose to count all cells from a given VC service class together. Cell counter 38 reports its counts once per measurement interval, which, in this example, is set to 8000 cells. This length of measurement interval corresponds to a measurement update rate of just under 46 Hz.

Measured cell rates are reported to bottlenecked VC detector 40, ABR estimator 42, and BRM cell processor 44. Bottlenecked VC detector 40 identifies active sources that are likely bottlenecked elsewhere, using these measured cell rates. ABR estimator 42 uses the cell rate measurements, along with bottlenecked VC statistics supplied by bottlenecked VC detector 40, to project available bit rate for the next measurement interval. BRM cell processor 44 uses measured cell rates, a fair share rate calculated by ABR estimator 42, and queue occupancy statistics from queue 32 to determine rate-control information for ABR sources.

Figure 3:
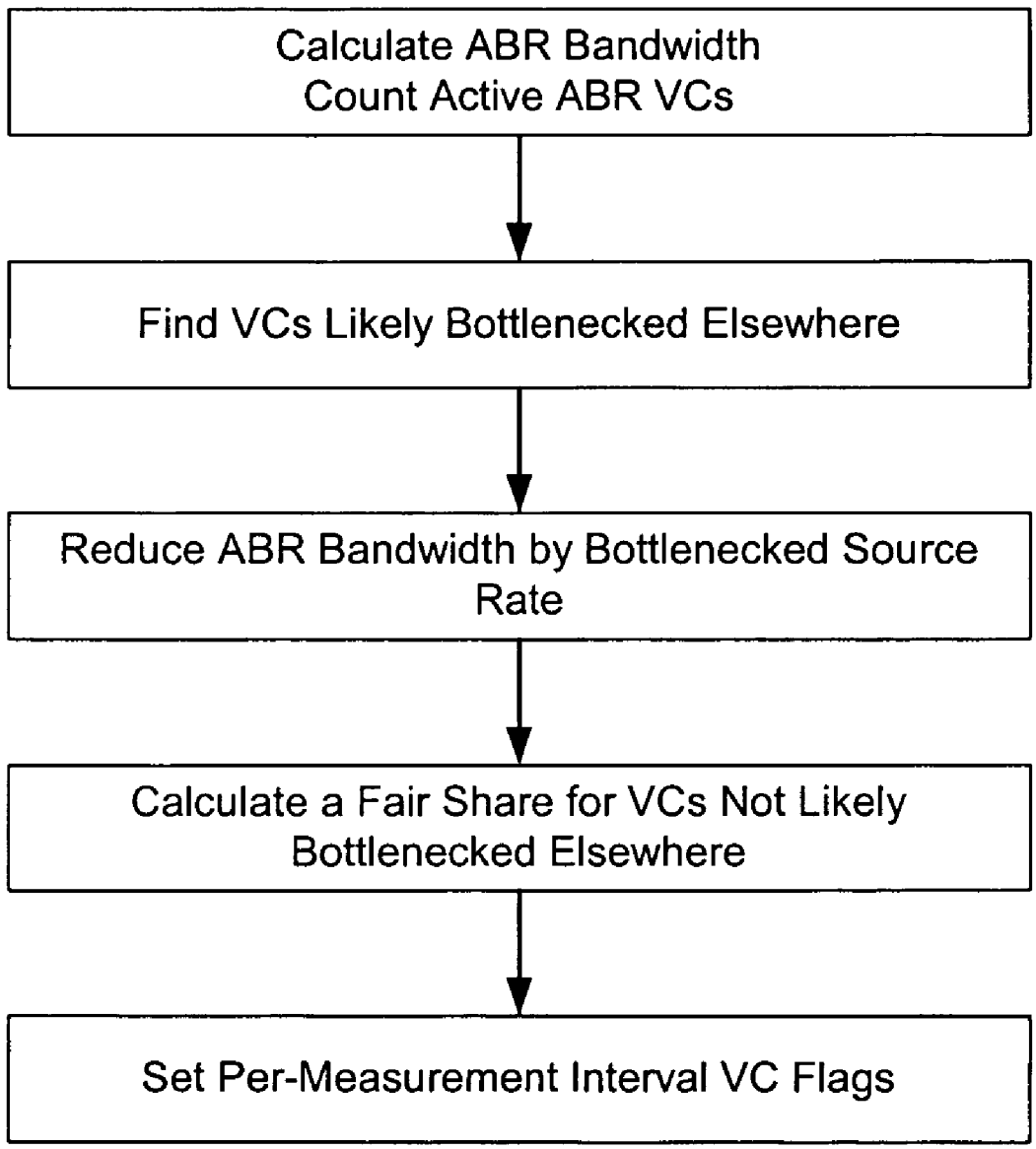
FIG. 3 shows ABR calculations performed by a switch at the end of a measurement interval, for one embodiment of the invention.

FIG. 3 illustrates a general process flow, according to an embodiment of the invention, for calculations that occur at the end of each measurement interval in switch 30. First, the bandwidth available for ABR VCs is calculated, and the active VCs are counted. Then, VCs that are likely bottlenecked elsewhere are identified. The ABR bandwidth is decreased by the aggregate cell rate of the VCs that are likely bottlenecked elsewhere. A fair share of the remaining ABR bandwidth is apportioned to each VC that is not bottlenecked elsewhere. Finally, per-VC metrics related to the measurement interval are set.

Figure 4:
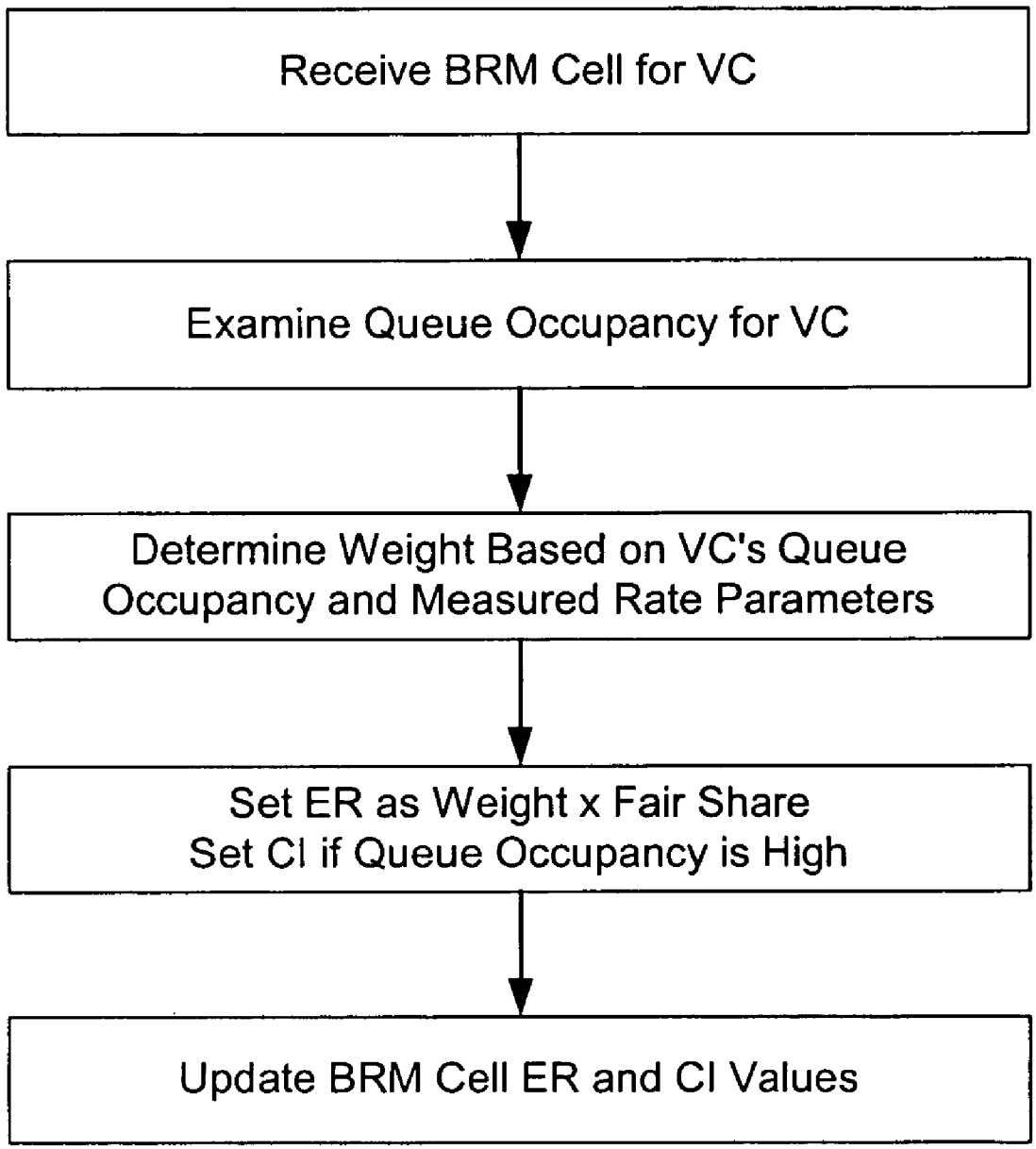
FIG. 4 shows ER calculations performed by a switch when it receives a BRM cell.

FIG. 4 illustrates a general process flow, according to an embodiment of the invention, for calculations that occur when a BRM cell is received for a specific VC. First, the current queue occupancy for the VC is examined. A weight factor is determined for the VC, based on its queue occupancy and the per-measurement interval rate metrics. An explicit rate for the VC is determined by multiplying the weight factor and the fair share rate together. A congestion indication flag is also set if the queue occupancy is high. The BRM cell ER and CI values are then updated as appropriate.

The following pseudocode segments illustrate a specific embodiment of the general process flows of FIGS. 3 and 4, implementing a bottlenecked VC detector, an ABR estimator, and a BRM cell processor. These sub-units can be implemented on a programmed digital processor (e.g., a microprocessor, digital signal processor, application-specific integrated circuit, or other special-purpose processor). In this pseudocode, the following parameters and measured values are defined for each port of the switch, and are assumed to be available to the digital processor:

| Name | Per-port Parameters Description | Default Value |
|---|---|---|
| C | Total number of cell transmission slots available during a measurement interval | 8000 |
| ABR_WT | ABR Weighted-Round-Robin (WRR) weight for apportioning bandwidth between ABR and UBR sources | 30 |
| UBR_WT | Corresponding UBR WRR weight | 20 |
| BTH | Bottlenecked source percent of ES threshold | 0.75 |
| BCH_TH | Bottlenecked source threshold for cell count change | 0.05 |
| ATH | Number of cells a VC must transmit during a measurement interval to be considered active | 1 |
| ALPHA | Exponential averaging factor | 0.5 |
| WEIGHT [2] [2] [2] | Three-dimensional array of possible fair share weightings | 35/32, 17/16, 33/32, 1, 29/32, 13/16, 11/16, 9/16 |

| Name | Measured Variables Description |
|---|---|
| GBR_CNT | A count, from cell counter 38, of the number of guaranteed-bandwidth cells departing during the last measurement interval (generally, CBR and VBR cells) |
| ABR_CNT | A count, from cell counter 38, of the number of ABR cells departing during the last measurement interval |
| UBR_CNT | A count, from cell counter 38, of the number of UBR cells departing during the last measurement interval |
| VC [ ]. CELL_CNT | An array, from cell counter 38, of per-VC cell counts for cells arriving during the last measurement interval |
| VC [ ].QUE_OCC | An array, from queue 32, of per-VC cell-in-queue counts |

Additionally, the following variables are either calculated by the digital processor, or for it by another sub-unit of the switch.

| Name | Calculated Variables Description |
|---|---|
| NOA | Number of VCs active during the last measurement interval |
| NUB | Number of VCs active during the last measurement interval, but likely bottlenecked elsewhere |
| ABR_BW | Number of cell transmission slots available to ABR sources during the measurement interval |
| UB_BW | Number of cell transmission slots required for ABR sources that are likely bottlenecked elsewhere |
| ES | Even share of ABR_BW |
| FS | Fair share of bandwidth for ABR sources that are not likely bottlenecked elsewhere |
| PFS | Fair share from the previous measurement interval |
| CTH | Congestion threshold for per-VC queue occupancy |
| VC [ ].PCNT | An array of per-VC CELL_CNT values observed during the previous measurement interval |
| VC [ ].CI | An array of per-VC flags indicating whether the VC's queue occupancy exceeds the current congestion threshold CTH |
| VC [ ].CCR_HI | An array of per-VC flags indicating whether the VC's cell count exceeds the current FS |
| VC [ ].TINC | An array of per-VC flags indicating whether the VC's traffic is increasing |
| Computed_ER | Explicit Rate value calculated for a BRM cell |
| CI | Calculated congestion indication for a VC |

A first group of calculations is performed after the end of each measurement interval. Example pseudocode for these calculations is as follows:

```
if(Measurement Interval Expired
    /* Initialize counters */
    NOA = NUB = UB_BW = 0;
    /* Calculate total bandwidth available for ABR */
    ABR_BW = (C - GBR_CNT)
            * max(ABR_CNT/(ABR_CNT + UBR_CNT),
                  ABR_WT/(ABR_WT + UBR_WT));
    /* Count the number of active VCs */
    for(all VC[i])
        if(VC[i].CELL_CNT >= ATH)NOA++;
    /* Compute even share bandwidth */
    ES = ABR_BW/NOA;
    /* Find VCs likely bottlenecked elsewhere */
    for(all VC[i])
        if((VC[i].CELL_CNT < BTH * ES)&&
            (abs(1.0 - VC[i].CELL_CNT/VC[i].PCNT) < BCH_TH)
        {
            UB_BW += VC[i].CELL_CNT;
            NUB++;
        }
    /* Compensate for VCs bottlenecked elsewhere */
    if(NOA == NUB)
        FS = ES;
Else
    FS = (ABR_BW - UB_BW)/(NOA - NUB);
/* Exponential filter the Fair Share */
FS = FS + ALPHA * (PFS - FS);
/* Set Per-measurement interval VC Flags */
for(all VC[i])
{
    /* test for over-fair share rate */
    if(VC[i].CELL_CNT > FS)          VC[i].CCR_HI = 1;
    else                              VC[i].CCR_HI = 0;
    /* test for increasing traffic */
    if(VC[i].CELL_CNT > VC[i].PCNT)   VC[i].TINC = 1;
    else                              VC[i].TINC = 0;
    /* prepare VC[i] for next measurement interval */
    VC[i].PCNT = VC[i].CELL_CNT;
    VC[i].CELL_CNT = 0;
}
/* clean up */
PFS = FS;
FS = FS/(C * CELL_PERIOD); /* convert to cells/sec */
```

After initialization of global counters, the algorithm first computes the number of available ABR timeslots, ABR_BW, available in the next measurement interval. This value has two factors. The first factor is the total number of best-effort timeslots available, and is calculated by subtracting the total number of cells whose transmission is guaranteed from the total number of timeslots available in the measurement interval. The second factor reflects an apportionment of best-effort bandwidth between ABR and other best-effort traffic classes (e.g., UBR).

In one preferred embodiment, apportionment is accomplished using static but programmable weights in conjunction with a Weighted Round Robin cell scheduler. For example, if ABR_WT is set to 30 cells and UBR_WT is set to 20 cells, the scheduler will transmit 30 ABR cells and 20 UBR cells during the next 50 available best-effort timeslots. Thus the appropriate factor for figuring the ABR bandwidth in this example is 30/(30+20)= 0.60, or 60 percent of the best-effort bandwidth. This factor, however, under-allocates bandwidth to ABR when UBR traffic is insufficient to use the remaining 40 percent of the best-effort bandwidth. Thus the factor is modified to use the actual ABR and UBR cell counts from the last measurement interval, whenever this results in a higher allocation to ABR traffic. This formulation guarantees some best-effort timeslots for UBR traffic, but allows these timeslots to be quickly re-allocated to ABR sources if they are unused.

The algorithm next determines NOA, the number of VCs that were active during the last measurement interval. This is preferred over using the total number of VCs, since including inactive VCs in subsequent calculations can cause bandwidth under-allocation for the active VCs. In a simple implementation, the complete ABR VC array is quickly examined, and a VC is counted as active if the switch has processed (e.g., received) at least ATH cells for that VC during the last measurement interval. The default value for ATH is 1, although the threshold may alternately vary as a function of ABR bandwidth and/or VCs being served.

Once the available ABR bandwidth and the number of active sources have been estimated, the algorithm computes ES, the even-share bandwidth. The even-share bandwidth is an equal division of ABR bandwidth between the active VCs. In the special case where all active VCs are bottlenecked at this switch, even-share bandwidth is equivalent to fair-share bandwidth. But in general, some active VCs are bottlenecked elsewhere and do not or cannot utilize their even-share bandwidth—this implies that the fair share for VCs bottlenecked by this switch will often be higher than the even share.

In order to identify those sources that are likely unable to use their even-share bandwidth, the present invention implements a bottlenecked source detector. In this embodiment, the bottlenecked source detector identifies sources that appear to be using less than the even share. The primary test implemented by the detector compares each active VC's cell count from the measurement interval with a threshold based on the even share value. The default threshold parameter sets the threshold at 75 percent of the even share value. Note that the comparison may alternately be based on similar statistics, such as the previous ES value or a previous FS value.

Preferably, a secondary test is also used to identify sources bottlenecked elsewhere. This second test looks at whether a source using less than the even share has been using a similar low cell rate for more than one measurement interval. Although many ways exist for implementing such a test, the preferred embodiment calculates a ratio of the VC's cell counts for the last two measurement intervals, and examines the percentage change in cell rate. If the percentage change is less than a preset threshold, the test is satisfied and the source is identified as bottlenecked elsewhere. Alternate secondary tests may, for example, check whether the primary test passed in the previous measurement interval, or allow decreases, but not significant increases, in cell rate from one interval to the next to be consistent with a bottlenecked source.

Other methods for determining bottlenecking may be used, e.g., to supplement one of the methods above. For example, if BRM cells corresponding to a VC are received with ER values lower than the current even share, or with CI already set, that VC may be classified as already bottlenecked by a downstream switch. This method would fail for detecting upstream switch bottlenecking, unless such switches inserted their rate information in FRM cells and the information was gleaned from FRM cells also.

When a source passes the bottlenecked elsewhere test or tests, it is counted (by incrementing NUB), and each such source has its cell count for the last measurement interval added to an aggregate cell count UB_BW that represents the number of timeslots utilized by bottlenecked-elsewhere VCs during the last measurement interval.

Once those sources likely bottlenecked elsewhere have been determined, the algorithm calculates a fair share value. Preferably, a pre-check is performed to ensure that all sources were not classified as bottlenecked elsewhere. If all active VCs are determined to be bottlenecked elsewhere, it is most likely that the system is ramping up (e.g., the available best-effort traffic slots have increased rapidly). In such a situation, the fair-share bandwidth is set equal to the even-share bandwidth.

If some active VCs are determined to be bottlenecked locally, a different fair-share estimate is used. This fair-share estimate ignores those VCs likely bottlenecked elsewhere and attempts to find a fair-share for the VCs bottlenecked locally. To accomplish this, the total number of ABR transmission slots available, ABR_BW, is reduced by the number of timeslots utilized by bottlenecked-elsewhere VCs, UB_BW. This reduced figure is then divided by the number of active sources that are likely bottlenecked locally (NOA-NUB) to obtain a fair share estimate. Preferably, the fair share estimate is exponentially low-pass filtered to smooth out measurement errors.

At this point, it is appropriate to perform tests on each VC's cell rate—tests that will be needed to fill in BRM cell values for that VC. The first test compares each VC's measured cell count to the calculated fair share rate, and sets a flag CCR_HI if the cell count exceeds the fair share. The second test looks at the trend of the cell rate. In this embodiment, the trend is classified by comparing the cell counts for the last two measurement intervals. If the measured cell rate has increased from the previous measurement interval, a traffic-increasing flag TINC is set. Note that an alternate preferred test examines, instead of cell rate, whether the VC's queue occupancy QUE_OCC is increasing.

A second group of calculations is performed each time a Backward RM Cell is serviced by BRM cell processor 44. Example pseudocode for these calculations is as follows:

if (Received BRM Cell for VC pointer *vc
  /* test *vc queue occupancy for congestion */
  if (vc->QUE_OCC >=CTH ) CI=1;
  else CI=0;
  /* calculate an explicit rate for *vc */
  Computed_ER=FS * WEIGHT[CI] [vc->CCR_HI] [vc->TINC];
  /* update values in BRM cell pointer *BRM_cell */
  BRM_cell->ER=min(Computed_ER,
    BRM_cell->ER );
  BRM_cell->CI=CI | | BRM_cell->CI;

The overall concepts embodied in the above code are twofold. First, the explicit rate sent to each source reflects a prediction of the future state of that source, i.e., whether the source is congested, in a non-congested state with impending congestion, congested but with congestion receding, etc. Secondly, high VC queue occupancy is also transmitted separately using the congestion indication flag, such that if the explicit rate is overly aggressive, queue occupancies can still be decreased rapidly for congested VCs.

Figure 5:
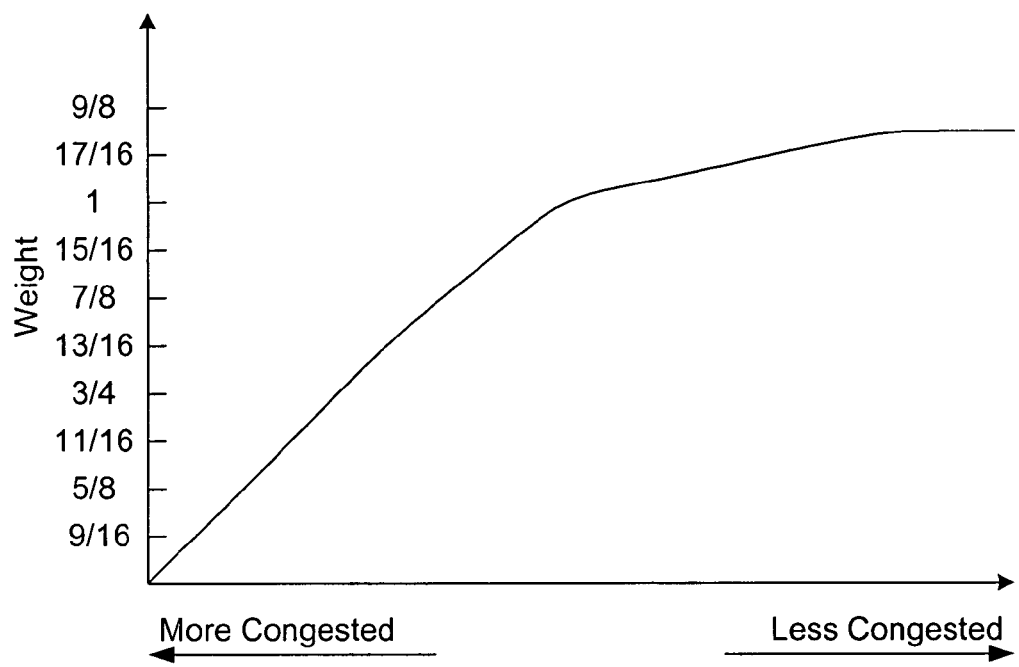
FIGS. 5 and 6 illustrate ER weighting curves according to embodiments of the invention.

FIG. 5 illustrates a continuous weighting function for determining ER for a VC. A weight of 1 implies that the fair share value FS is the desired explicit rate. Higher weights allocate bandwidth greater than FS to the VC, and lower weights allocate bandwidth less than FS to the VC. Generally, less-congested sources are allowed more bandwidth, and more-congested sources are allowed less bandwidth.

Figure 6:
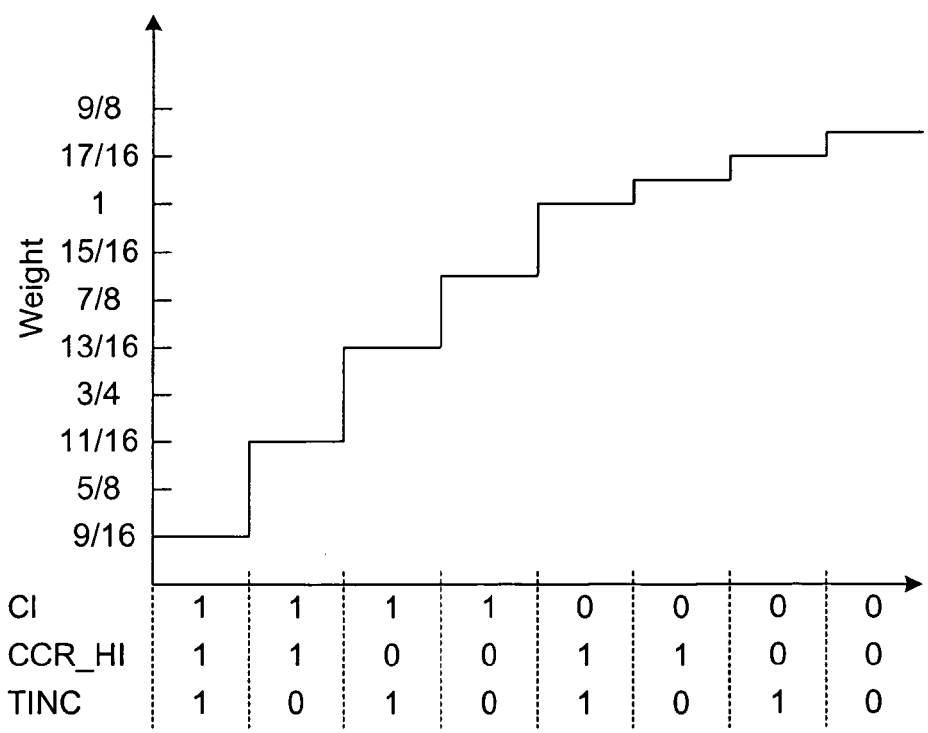

Because of transmission and measurement delays in the system, it is desirable that the weighting function selection process be predictive of future congestion. This prediction is accomplished by looking at a VC's current position, rate, and acceleration states. Although a continuous function based on queue, rate, and acceleration measurements is possible, the preferred embodiment uses a discrete approximation instead. FIG. 6 illustrates an eight-segment approximation of the weighting function of FIG. 5. This approximation predicts future congestion for a VC based on three flags that respectively represent: i) whether the VC is currently congested (CI); ii) whether the VC's last measured rate is greater than or less than the fair share (CCR_HI); and iii) whether the VC's traffic level appears to be increasing or decreasing (TINC). In the pseudocode above, TINC is estimated by comparing the VC's cell count for the two previous measurement intervals, and thus is updated only once per measurement interval. When TINC is estimated by comparing queue occupancies at two different times, TINC may vary faster than the measurement interval.

In the approximation of FIG. 6, congestion indication (CI) has the greatest significance on weighting. CI is determined by comparing a VC's queue occupancy QUE_OCC against a congestion threshold CTH. CTH generally varies inversely with the number of VCs being serviced by the switch—that is, a target overall queue fullness is apportioned among the VCs, and a VC is congested if its queue occupancy exceeds CTH. Congested sources are asked to reduce their rates below FS, while uncongested sources are allowed an explicit rate equal to or greater than FS. Preferably, CI is determined anew each time a BRM_cell for a VC is examined.

Two other variables are used to "fine tune" the congestion prediction for weighting. The secondary variable is CCR_HI, a flag indicating whether the last rate measurement exceeds the fair share weight. Those VCs using less than the fair share are predicted to be less congested in the future than those using more than the fair share, and are thus allowed a higher rate, even if they are presently congested. The third variable is TINC, a flag indicating whether a VC's traffic level is increasing. Those VCs whose queue occupancy and/or rate appear high, but show a decreasing trend, are allowed slightly higher weights than other VCs with similar queue occupancies and/or rates.

In the pseudocode above, the three variables CI, CCR_HI, and TINC are used to index into a 2×2×2 weight array WEIGHT. In an alternate implementation, three nested tests can be used to accomplish the same result.

The explicit rate contained in the BRM cell is updated using Computed_ER. But if Computed_ER exceeds the explicit rate already contained in the cell, that lower rate is left intact.

The final line in the pseudocode ensures that the congestion indication flag CI of the BRM cell is set if that VC's queue is congested. This step is a desirable addition, since it allows the switch to quickly respond to congestion in a particular VC queue, even when a high overall fair share results in a relatively high Computed_ER for that VC.

The constants and multiplying factors disclosed above were empirically determined based on simulations performed with specific traffic assumption. They have been found to work well with a wide range of network topologies and traffic assumptions. They have not, however, been shown to be optimal under all circumstances, and may require adjustment for a specific embodiment.

The present invention can also be used with non-standard service classes, such as "UBR+". UBR+is essentially UBR with an MCR guarantee—thus UBR+sources can count on a guaranteed minimum bandwidth at low delay, with no further guarantees.

To function properly with UBR+traffic, several minor modifications to the above algorithm are required. First, the guaranteed bandwidth count GBR_CNT needs to account for the guaranteed portion of UBR+traffic, with the caveat that if the measured UBR+traffic is lower than its configured MCR, the amount of guaranteed traffic for the next measurement interval is the amount of measured traffic. The guaranteed bandwidth count can be computed as:

GBR_CNT=CBR_CNT+VBR_CNT+min
(UBR_CNT, Config_UBR_MCR);

The second modification can then be made to the UBR cell count. In the presence of UBR+traffic with non-zero MCR, only the elastic (best effort) part of the UBR+bandwidth should be used in computing the amount of best-effort bandwidth available for ABR service. Therefore, the measured UBR/UBR+bandwidth, UBR_CNT, should be adjusted:

UBR_CNT=min(0,
UBR_CNT−Config_UBR_MCR);

The basic rate control method uses Max-Min fairness without regard to each source's MCR attribute. Other fairness criteria can be used to reach different fair-share allocations. For instance, fair share can be defined as MCR plus an equal share of the remaining available bandwidth. The algorithm disclosed above can be extended to implement this criteria if several variables are available. First, a variable CONFIG_ABR_MCR is needed to represent the sum of the configured MCR values for all active ABR VCs, and a variable CONFIG_UB_MCR is needed to represent the sum of the configured MCR values for those VCs that are likely bottlenecked elsewhere. Also, the VC[ ] array structure should be modified to include an element VC[ ].MCR.

The pseudocode for the measurement interval is then modified as follows:

```
if(Measurement Interval Expired)
    /* Initialize counters */
    NOA = NUB = UB_BW = CONFIG_ABR_MCR =
    CONFIG_UB_MCR = 0;
    /* Calculate total bandwidth available for ABR */
    ABR_BW = (C − GBR_CNT)
            * max(ABR_CNT/(ABR_CNT + UBR_CNT),
                  ABR_WT/(ABR_WT + UBR_WT));
    /* Count the number of active VCs, and their MCRs */
    for(all VC[i])
        if(VC[i].CELL_CNT >= ATH)
        {
            NOA++;
            CONFIG_ABR_MCR += VC[i].MCR;
        }
    /* Compute even share bandwidth */
    ES = ABR_BW/NOA;
    /* Find VCs likely bottlenecked elsewhere */
    for(all VC[i])
        if((VC[i].CELL_CNT < BTH * ES)&&
           (abs(1.0 − VC[i].CELL_CNT/VC[i].PCNT) < BCH_TH)
        {
            UB_BW += VC[i].CELL_CNT;
            CONFIG_UB_MCR += VC[i].MCR;
            NUB++;
        }
    /* Compensate for VCs bottlenecked elsewhere */
    if(NOA == NUB)
        FS = ES − CONFIG_ABR_MCR;
    Else
        FS = (ABR_BW − UB_BW
             − CONFIG_ABR_MCR + CONFIG_UB_MCR)
             /(NOA − NUB);
... /* Remainder Unchanged */
    Processing of a BRM cell uses a modified computed ER
    calculation:
```

```
/* calculate an explicit rate for *vc */
Computed_ER = FS * WEIGHT[CI] [vc−>CCR_HI] [vc−>TINC]
              + vc−>MCR;
```

Those of skill in the art will recognize that other variations on fairness can also be implemented, e.g., MCR can also be considered in the identification of those sources likely bottlenecked elsewhere.

The operation of the invention can be appreciated first, as applied to a simple example, and second, as applied to a complex network simulation. The simple example assumes four VCs, VC1–VC4, competing for 200 ABR timeslots available during a measurement interval. The VCs begin the example with these measured cell counts: VC1: 50; VC2: 40; VC3: 30; VC4: 20. Also, VC3 and VC4 have their bandwidth limited elsewhere. VC1 and VC2 are bottlenecked locally-after a new explicit rate is sent to them, their cell count moves two-thirds of the distance to the new explicit rate in one measurement interval.

Figure 7:
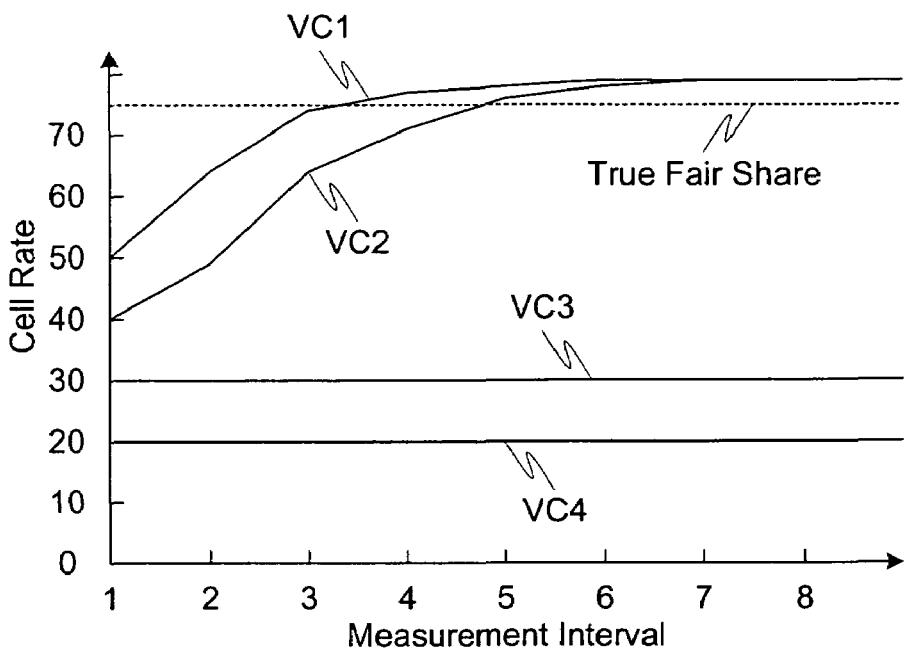
FIGS. 7 and 8 show cell throughput for an example, calculated respectively for a prior art ER algorithm and an embodiment of the invention.

FIG. 7 shows the performance of an "ERICA" prior art algorithm on this example. The algorithm divides the available timeslot capacity (200) by four, calculating a "fair share" of 50. At the end of measurement interval 1, the algorithm divides the aggregate cell count (140) by the capacity, reaching a load factor of 0.7. Each VC is then assigned an explicit rate that is the maximum of its measured rate divided by the load factor, or the fair share.

Several observations can be made about the behavior of the prior art algorithm in this example. First, the "fair share" is badly underestimated because of the two sources bottlenecked elsewhere, and never really becomes a factor in setting ER for the sources bottlenecked locally. Second, because the explicit rate is a function of current rate, VC2 lags VC1 in achieving parity (note that ERICA's MaxAllocPrevious patch kicks in after an initial delay to drive the sources towards parity). Third, the algorithm reaches a steady-state value that exceeds the capacity of 200 cells/ measurement interval. This situation will persist in this example until either a capacity change that adjusts the state, or a queue overflow. A global queue overflow detection and correction may help, but will likely result in a period of long queuing delays for VC1 and VC2 before detection.

Figure 8:
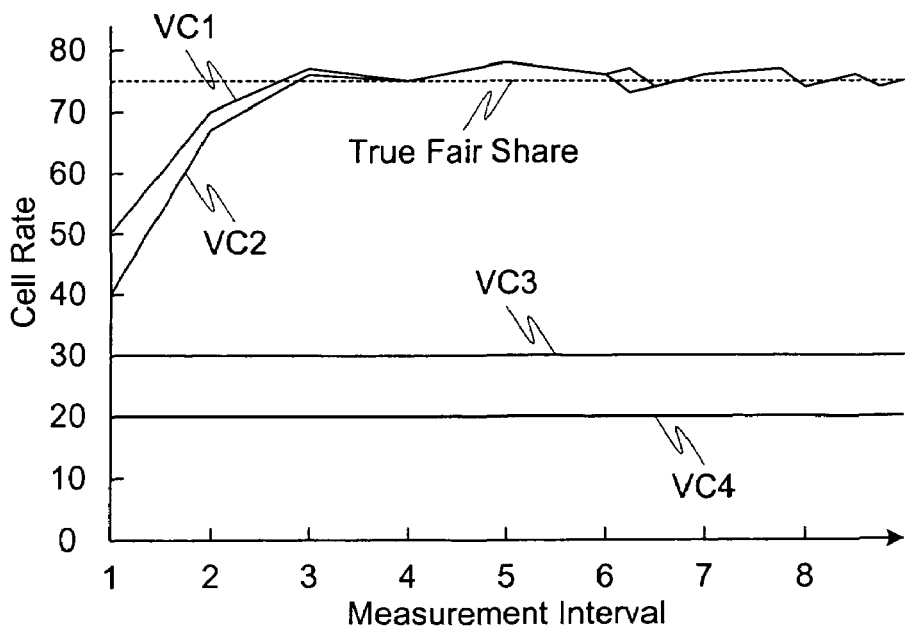

FIG. 8 shows the response of an embodiment of the present invention for the same example. VC3 and VC4 are detected as likely bottlenecked elsewhere because their cell counts are less than 75% of the even share. This results in a correct fair share (75 cells) being calculated for VC1 and VC2. VC1 and VC2 quickly converge to a value slightly higher than this fair share, allowing their respective queues to fill to the congestion level. After measurement interval 6, the queues begin to reach their congestion levels, resulting in some multiple rate corrections per measurement interval (assuming two to three BRM cells per interval for each of VC1 and VC2) as the queues fluctuate about their congestion levels.

EXPERIMENTAL RESULTS

Figure 9:
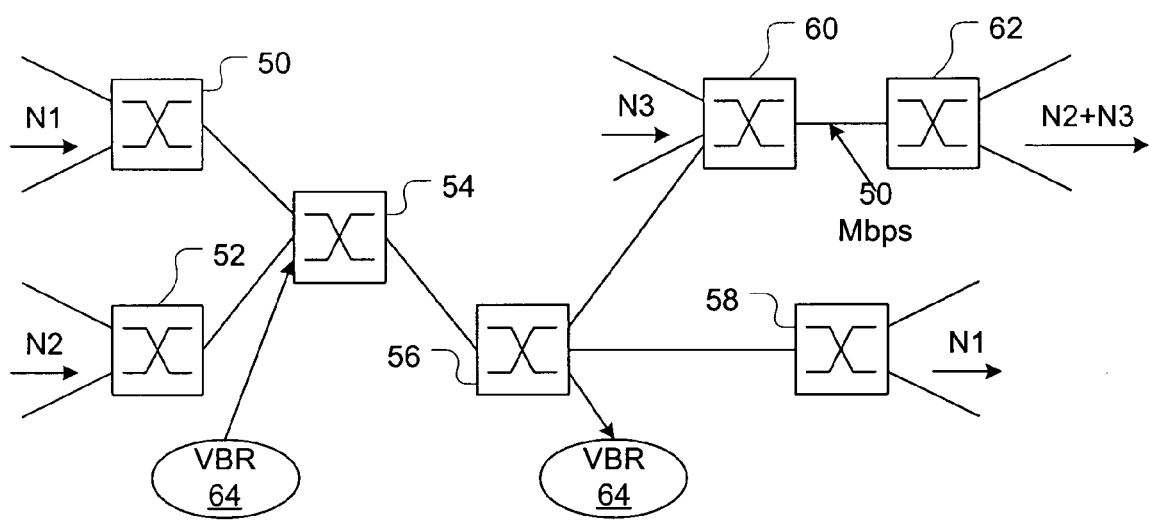
FIG. 9 shows a network configuration used to perform a test simulation.

An extensive set of simulations were carried out to verify the performance of the invention under a wide range of conditions. Results are shown herein for one tested configuration (see FIG. 9). This configuration simulates a dual bottleneck. Two groups of VCs, N1 VCs from switch 50 and N2 VCs from switch 52, traverse one bottleneck link connecting switch 54 and switch 56. This same bottleneck link is shared with an aggregation of 120 actual MPEG traces used to simulate VBR traffic 64. The group of VCs N1 travels from switch 56 to switch 58, while the group of VCs N2 travels from switch 56 to switch 60. Another group of VCs N3 enters switch 60, and together with N2, traverses the second bottleneck link to switch 62. In this configuration, at switch 54 N1 is bottlenecked locally, while N2 is bottlenecked elsewhere. All links, except the 50 Mbps link between switch 60 and switch 62, were modeled as 150 Mbps links.

Each ABR VC in the simulation is a TCP connection with a greedy traffic source, i.e., the VC has an infinite amount of data that it will attempt to send as fast as possible, subject to TCP's windowed flow control. Default values were used for ABR parameters, except for the following: PCR: 150 Mbps; MCR: 1.5 Mbps; ICR: 10 Mbps; RIF: $\frac{1}{16}$; RDF: $\frac{1}{16}$.

The VBR traffic used in the simulations consists of an aggregate of 120 MPEG-1 traces, obtained from two public-domain ftp servers. The trace file records the size of the MPEG-1 encoded data blocks and the time the block is generated. The traces represent a wide range of scenes, from relatively stable TV talk shows, to action-packed movies such as Jurassic Park and Star Wars. Multiple copies of each trace file are multiplexed together (with uniformly distributed random phase-shifts) to obtain a single aggregate MPEG-1 stream with a mean bit rate of approximately 69 Mbps. The PCR for the VBR stream is set at 120 Mbps, in order to provide a minimum of 30 Mbps for the ABR VCs. The resulting VBR traffic is highly bursty.

Each switch is modeled as a generic shared-memory switch with per-VC buffers. Each per-VC queue has a programmable congestion threshold, which is set to 100 cells in all the simulation runs. The buffer/queue size is assumed to be arbitrarily large so that no cell will be dropped. This is done so that the queue dynamics can be observed, aiding an understanding of the buffer requirement for zero-cell loss. If finite buffers are assumed, cell loss can occur; lost cells will trigger TCP to retransmit and go into a slow-start/congestion avoidance phase. Since this study is focused on ABR ER performance, any effect due to external factors such as TCP needs to be avoided.

The comparison RR mode used in the simulations signals congestion with a simple threshold crossing, resulting in the CI bit being set to 1 on backward RM cells. The NI bit is not used.

The link distances (delays) simulated for the network topology corresponds to an extended campus-type environment. The inter-switch links are 5 Km long, and the host-to-switch distances are 0.5 Km, yielding a range of RTT from 60 to 220 $\mu$s.

Figure 10:
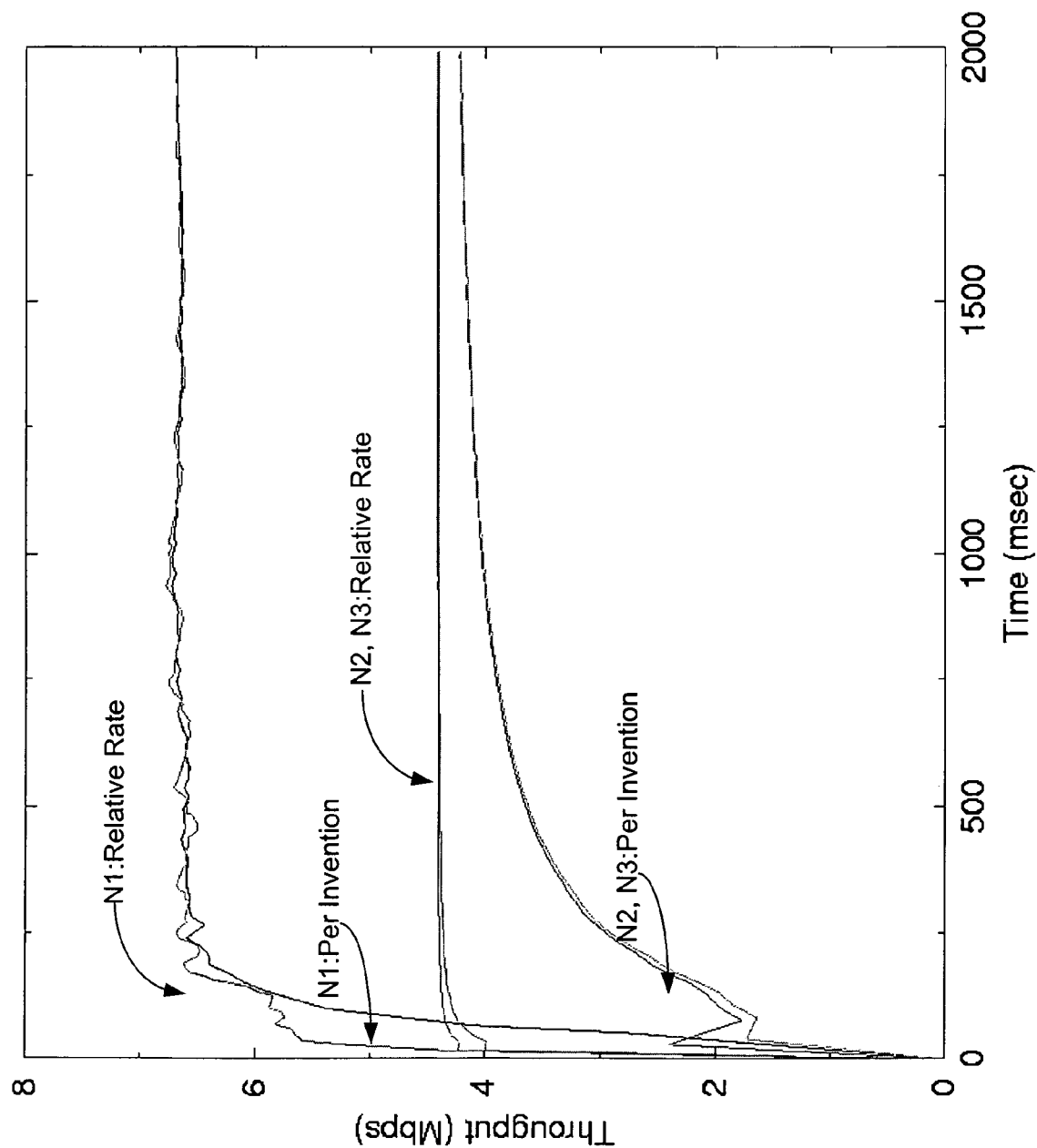
FIGS. 10 and 11 show results of the test simulation.
Figure 11:
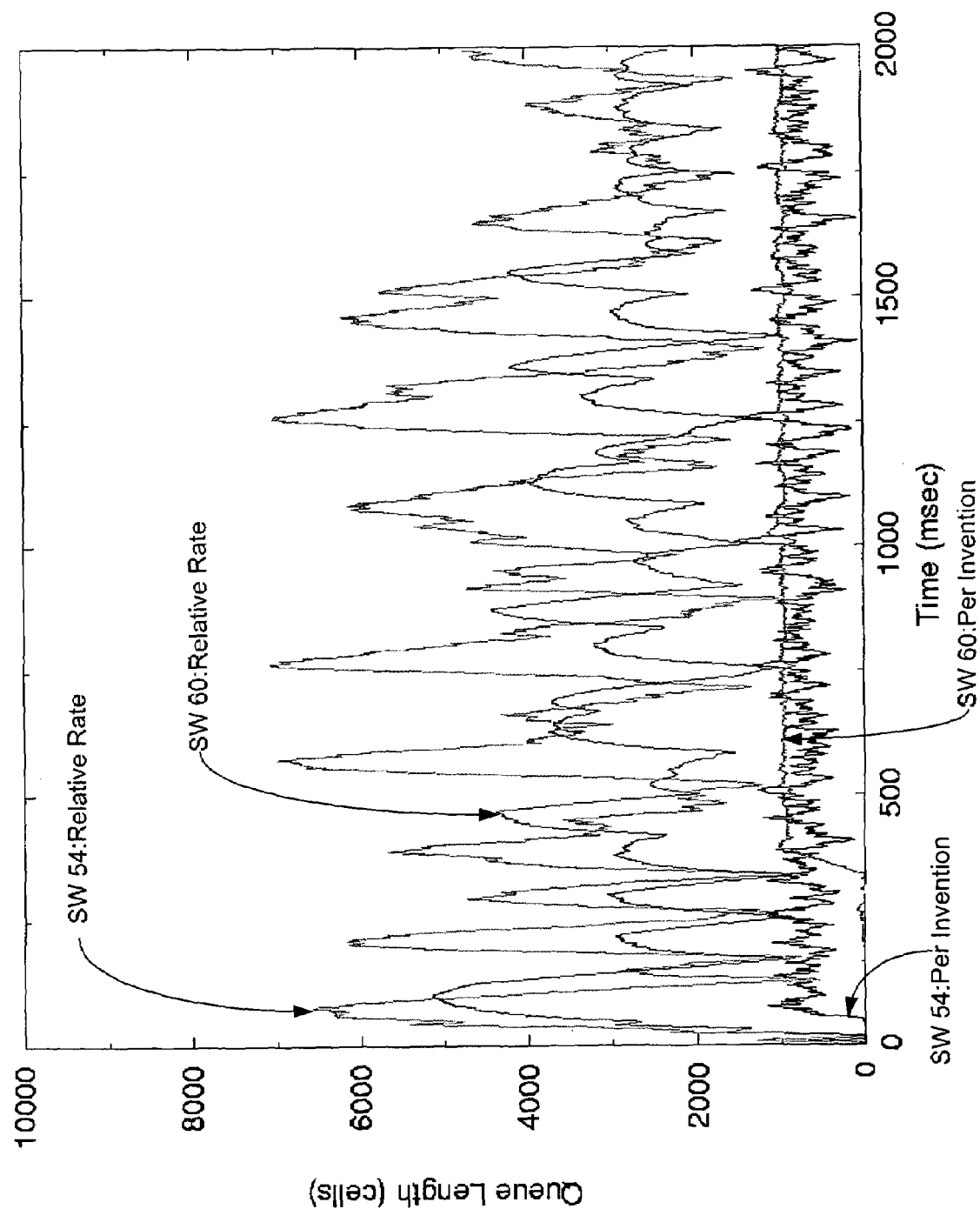

FIGS. 10 and 11 show the results of two simulation runs with the above-listed parameters. The first simulation run uses the first-disclosed embodiment of the invention. The second simulation run uses the RR mode for comparison. In the simulation, N1=8, N2=4, and N3=6. Thus the aggregate of the queue congestion thresholds is 1200 cells at switch 54, and 1000 cells at switch 60. FIG. 10 compares throughput for the two runs, and FIG. 11 compares aggregate queue length for the two runs.

FIG. 10 shows that with the simulation settings used, the invention achieves slightly lower throughput than the RR comparison mode. But FIG. 11 shows that the invention maintains considerably smaller aggregate queue lengths than the RR comparison mode, and has significantly smaller excursions—an indicator that the RR mode consistently and significantly exceeds the congestion thresholds of the VC queues. This explains the small decrease in throughput for the embodiment of the invention—the queue for switch 60 remains empty for a time after start-up, as the bottleneck at switch 54 is controlled to maintain small queues. This suggests that the invention can be configured to run with a higher per-VC congestion threshold than the RR algorithm, and/or that the invention can provide increased queue stability as RTT is increased. For identical congestion thresholds, the invention requires about one-sixth the buffer size of the RR algorithm to avoid cell loss.

The disclosed embodiments presented herein are exemplary. Various modifications to the disclosed embodiments will be obvious to those of ordinary skill in the art upon reading this disclosure, and are intended to fall within the scope of the invention as claimed.

What is claimed is:

1. An article of manufacture comprising computer-readable media containing instructions that, when executed or interpreted by a digital processor or cooperating processors, cause that processor or processors to perform a method of determining allowable cell rates for sources utilizing a switch, the method comprising:
   estimating the number of rate-controlled sources actively utilizing the switch;
   estimating the cell rate available to serve the active rate-controlled sources;
   identifying those active sources that are likely bottlenecked elsewhere in their connection;
   forming a reduced available cell rate estimate by reducing the cell rate available to serve the active sources by a bottlenecked source cell rate, the bottlenecked source cell rate based on estimated cell rates of those active sources that are likely bottlenecked elsewhere; and
   calculating a fair share of the reduced available cell rate by apportioning the reduced available cell rate among those active sources that are not likely bottlenecked elsewhere.

2. The article of manufacture of claim 1, wherein estimating the number of rate controlled sources actively utilizing the switch comprises counting, over a measurement interval, the number of cells processed by the switch for each rate-controlled source utilizing the switch during the interval, and counting a rate-controlled source as active if the number of cells processed for that source during the interval passes a preset threshold.

3. The article of manufacture of claim 2, wherein a source passes the preset threshold if the switch processed at least one cell for that source during the interval.

4. The article of manufacture of claim 2, wherein a cell is counted as processed when received by the switch.

5. The article of manufacture of claim 1, wherein identifying those active sources that are likely bottlenecked elsewhere in their connection comprises the steps of:
   calculating, for each active source, a cell count equal to the number of cells from that active source processed by the switch over a measurement interval;
   estimating, from the number of active sources and the available cell rate, the average cell rate available for each active source; and
   identifying an active source as likely bottlenecked elsewhere when that source's cell count falls below a cell count threshold based on the average cell rate.

6. The article of manufacture of claim 5, wherein identifying those active sources that are likely bottlenecked elsewhere in their connection further comprises additionally requiring for identification of an active source as likely bottlenecked elsewhere, that the source's low cell rate has persisted for more than one measurement interval.

7. The article of manufacture of claim 6, wherein determining whether a source's low cell rate has persisted for more than one measurement interval comprises comparing two cell counts for an active source, the two cell counts calculated over successive measurement intervals.

8. The article of manufacture of claim 1, wherein forming a reduced available cell rate estimate comprises:
calculating, for each active source that is likely bottlenecked elsewhere, a cell count equal to the number of cells from that active source processed by the switch over a measurement interval; and
subtracting each of these cell count values from the available cell rate.

9. The article of manufacture of claim 1, further comprising low-pass filtering the calculated fair share value.

10. The article of manufacture of claim 1, wherein in addition to rate-controlled sources, the switch serves unspecified bit rate sources, and wherein estimating the cell rate available to serve the active rate-controlled sources comprises:
estimating the cell rate BR available to serve both the active rate-controlled sources and the unspecified bit rate sources; and
setting the cell rate BR_RC available to serve active rate-controlled sources as a fraction of the cell rate available to serve both types of sources, based on a relative weighting of cell rates between the two types of sources.

11. The article of manufacture of claim 10, wherein the relative weighting of cell rates is specified by an active rate-controlled share weight SW_RC and an unspecified bit rate share weight SW_UB, and wherein setting the cell rate BR_RC comprises:
counting, over a measurement interval, the number of cells CNT_RC processed by the switch for rate-controlled sources, and the number of cells CNT_UB processed by the switch for unspecified bit rate sources; and $$\text{setting BR\_RC} = BR \times \max\left(\frac{\text{SW\_RC}}{\text{SW\_RC} + \text{SW\_UB}}, \frac{\text{CNT\_RC}}{\text{CNT\_RC} + \text{CNT\_UB}}\right).$$

12. The article of manufacture of claim 11, wherein at least one rate-controlled or unspecified bit rate source is guaranteed a minimum cell rate MCR, and wherein this minimum cell rate in not included in either CNT_RC or CNT_UB.

13. The article of manufacture of claim 12, wherein the source that is guaranteed a minimum cell rate MCR is an unspecified bit rate source, and wherein counting the number of cells CNT_UB comprises:
calculating a raw cell count RCNT_UB representing all cells processed by the switch for unspecified bit rate sources over the measurement interval; and
setting CNT_UB=min(0, RCNT_UB−MCR).

14. The article of manufacture of claim 12, wherein the source that is guaranteed a minimum cell rate MCR is a rate-controlled source, and wherein counting the number of cells CNT_RC comprises:
calculating a raw cell count RCNT_RC representing all cells processed by the switch for rate-controlled sources over the measurement interval; and
setting CNT_RC=min(0, RCNT_RC−MCR).

15. An article of manufacture comprising computer-readable media containing instructions that, when executed or interpreted by a digital processor or cooperating processors, cause that processor or processors to perform a method of providing rate feedback to a rate-controlled source utilizing a switch, the method comprising:
monitoring the cell queue occupancy for the rate-controlled source;
upon receiving a backward resource management cell bound for the rate-controlled source, calculating an explicit rate for the source based on a fair share rate and the source's predicted cell queue occupancy; and
inserting the explicit rate in the backward resource management cell when the explicit rate is lower than the explicit rate already contained in the cell.

16. The article of manufacture of claim 15, wherein the predicted cell queue occupancy is updated each time a cell is inserted in the cell queue.

17. The article of manufacture of claim 15, wherein calculating an explicit rate comprises:
comparing the source's current cell queue occupancy to a congestion threshold; and
setting the explicit rate to a first multiple of the fair share rate when the cell queue occupancy exceeds the congestion threshold, and setting the explicit rate to a second multiple of the fair share rate, greater than the first multiple, when the cell queue occupancy does not exceed the congestion threshold.

18. The article of manufacture of claim 17, further comprising setting a congestion indication flag in the backward resource management cell when the cell queue occupancy exceeds the congestion threshold.

19. The article of manufacture of claim 17, wherein the congestion threshold is a function of the number of sources that the switch is maintaining queues for.

20. The article of manufacture of claim 15, wherein the calculated explicit rate is further based on whether the source's last measured cell rate is higher than the fair share rate.

21. The article of manufacture of claim 15, wherein the calculated explicit rate is further based on whether the source's traffic load is increasing.

22. The article of manufacture of claim 21, wherein a source's traffic load is increasing when the source's measured cell rate has increased over the last two measurement intervals.

23. The article of manufacture of claim 21, wherein a source's traffic load is increasing when the source's queue occupancy has increased over the interval between a first queue occupancy measurement and a second queue occupancy measurement.

24. The article of manufacture of claim 15, wherein the calculated explicit rate is further based on whether the source's traffic load is increasing and on whether the source's last measured cell rate is higher than the fair share rate.

25. The article of manufacture of claim 24, wherein the highest explicit rate is calculated for a source with a queue occupancy that does not exceed a congestion threshold, a traffic load that is not increasing, and a last measured cell rate that does not exceed the fair share rate, and wherein the lowest explicit rate is calculated for a source with a queue occupancy that exceeds the congestion threshold, a traffic load that is increasing, and a last measured cell rate that exceeds the fair share rate.

26. The article of manufacture of claim 24, wherein the step of calculating an explicit rate comprises selecting one of eight multiples of the fair share rate, based on the results of three binary tests, the first test comprising comparing the source's current queue occupancy to a congestion threshold, the second test comprising examining whether the source's traffic load is increasing, and the third test comprising comparing the source's last measured cell rate to the fair share rate.

27. A cell switch comprising:
a cell queue that maintains a source cell queue for each rate-controlled source utilizing the switch;
a cell counter that counts the number of cells passing through each source cell queue;
a bottlenecked source detector that detects bottlenecked sources based on statistics calculated by the cell counter; and
an available bit rate estimator that periodically calculates the transmission rate available to service rate-controlled sources that are not detected as bottlenecked by the bottlenecked source detector and reduces the calculated available transmission rate by an aggregated cell rate for estimated bottlenecked sources, and apportioning the reduced available transmission rate among active rate-controlled sources not detected as bottlenecked sources.

28. The cell switch of claim 27, wherein the cell counter has the capability to estimate the number of rate-controlled sources actively utilizing the switch, by counting, over a measurement interval, the number of cells processed by the switch for each rate-controlled source utilizing the switch during the interval, and counting a rate-controlled source as active if the number of cells processed for that source during the interval passes a preset threshold.

29. The cell switch of claim 28, wherein the bottlenecked source detector has the capability to:
calculate, for each active source, a cell count equal to the number of cells from that active source processed by the switch over a measurement interval;
estimate, from the number of active sources and the available cell rate, the average cell rate available for each active source; and
identify an active source as likely bottlenecked elsewhere when that source's cell count falls below a cell count threshold based on the average cell rate.

30. The cell switch of claim 29, wherein the bottlenecked source detector has the capability to identify an active source as likely bottlenecked elsewhere when that source has a low cell rate that persists for more than one measurement interval.

31. The cell switch of claim 27, wherein the available bit rate estimator calculates an estimated cell rate for bottlenecked sources by summing the cell counts of the bottlenecked sources over a measurement interval.

32. The cell switch of claim 27, wherein in addition to rate-controlled sources, the switch serves unspecified bit rate sources, and wherein the available bit rate estimator:
estimates the cell rate BR available to serve both the active rate-controlled sources and the unspecified bit rate sources; and
sets the cell rate BR_RC available to serve active rate-controlled sources as a fraction of the cell rate available to serve both types of sources, based on a relative weighting of cell rates between the two types of sources.

33. The cell switch of claim 32, wherein the relative weighting of cell rates is specified by an active rate-controlled share weight SW_RC and an unspecified bit rate share weight SW_UB, and wherein the available bit rate estimator sets the cell rate BR_RC by:
summing, over a measurement interval, the number of cells CNT_RC processed by the switch for rate-controlled sources, and the number of cells CNT_UB processed by the switch for unspecified bit rate sources; and $$\text{setting BR\_RC} = BR \times \max\left(\frac{SW\_RC}{SW\_RC + SW\_UB}, \frac{CNT\_RC}{CNT\_RC + CNT\_UB}\right).$$

34. The cell switch of claim 33, wherein the switch guarantees at least one rate controlled or unspecified bit rate source a minimum cell rate MCR, and wherein the available bit rate estimator does not include this minimum cell rate in either CNT_RC or CNT_UB.

35. The cell switch of claim 34, wherein the source that is guaranteed a minimum cell rate MCR is an unspecified bit rate source, and wherein available bit rate estimator sets the number of cells CNT_UB=min(0, RCNT_UB−MCR), wherein RCNT_UB is a raw cell count representing all cells processed by the switch for unspecified bit rate sources over the measurement interval.

36. The cell switch of claim 34, wherein the source that is guaranteed a minimum cell rate MCR is a rate-controlled source, and wherein the available bit rate estimator sets the number of cells CNT_RC=min(0, RCNT_RC−MCR), wherein RCNT_RC is a raw cell count representing all cells processed by the switch for rate-controlled sources over the measurement interval.

\* \* \* \* \*

UNITED STATES PATENT AND TRADEMARK OFFICE
CERTIFICATE OF CORRECTION

PATENT NO. : 6,967,923 B1 Page 1 of 1
APPLICATION NO. : 10/338173
DATED : November 22, 2005
INVENTOR(S) : Fang It is certified that error appears in the above-identified patent and that said Letters Patent is hereby corrected as shown below:

At column 11, line 65, please replace "of-a" with --of a--

Signed and Sealed this

Seventeenth Day of October, 2006

JON W. DUDAS
*Director of the United States Patent and Trademark Office*